United States Patent [19]
March et al.

[11] Patent Number: 5,937,521
[45] Date of Patent: Aug. 17, 1999

[54] METHOD OF MAKING EXTRUDED PLASTIC MEMBERS

[75] Inventors: Frank A. March, Leesburg, Va.;
Russell J. Gould, Mt. Prospect, Ill.;
William R. Curtis, Bunker Hill, W. Va.; Rickey L. Bowen; Walter R. Markle, both of Winchester, Va.

[73] Assignee: Seaward International, Inc., Clearbrook, Va.

[21] Appl. No.: 08/862,305

[22] Filed: May 23, 1997

[51] Int. Cl.$^6$ .............................. B23P 15/00; B29C 47/02
[52] U.S. Cl. ........................ 29/897.34; 29/417; 264/40.7; 264/148; 264/149; 264/171.11; 264/237; 264/265
[58] Field of Search ................................. 264/40.1, 40.7, 264/145, 148, 149, 171.11, 237, 265; 29/897.34, 417

[56] References Cited

U.S. PATENT DOCUMENTS

| | | |
|---|---|---|
| 3,528,458 | 9/1970 | Gaeckel . |
| 3,929,957 | 12/1975 | Holden et al. ............................ 264/150 |
| 4,118,162 | 10/1978 | Baumgarten ............................ 425/113 |
| 4,242,296 | 12/1980 | Bricker .................................... 264/149 |
| 4,291,453 | 9/1981 | Mathieu ................................... 29/417 |
| 4,394,338 | 7/1983 | Fuwa . |
| 4,485,057 | 11/1984 | Kristensson et al. . |
| 4,629,597 | 12/1986 | Charlebois et al. . |
| 4,725,165 | 2/1988 | Langran . |
| 4,769,286 | 9/1988 | LeNoane . |
| 4,824,497 | 4/1989 | Tilman . |
| 5,051,285 | 9/1991 | Borzakian .............................. 428/36.4 |
| 5,096,645 | 3/1992 | Fink . |
| 5,180,531 | 1/1993 | Borzakian . |
| 5,217,655 | 6/1993 | Schmidt . |
| 5,650,224 | 7/1997 | March et al. ............................ 428/297 |
| 5,658,519 | 8/1997 | March et al. ............................ 264/135 |

*Primary Examiner*—Jan H. Silbaugh
*Assistant Examiner*—Mark Eashoo
*Attorney, Agent, or Firm*—Blank Rome Comisky & McCauley LLP

[57] ABSTRACT

Improvements in a method for extruding plastic members includes a joint connection for splicing glass fiber rebars together in end-to-end relation for use as reinforcing elements in an extruded plastic member. The extruded plastic member is cut into predetermined lengths at the locations of the splices or joint connections so that the reinforcing rebars in the extruded members are joint- or splice-free. A device for locating the position of the splices in the extruded plastic member is suspended above the extrusion apparatus and is adjustable for any predetermined length of reinforcing rebars to be used in the extruded plastic member. After the extruded member is cut, a chilled plate is inserted into the cut to cool and solidify any molten plastic that may remain at the confronting surfaces of the cut to prevent leakage of molten plastic from the cut ends of the extruded plastic member.

17 Claims, 3 Drawing Sheets

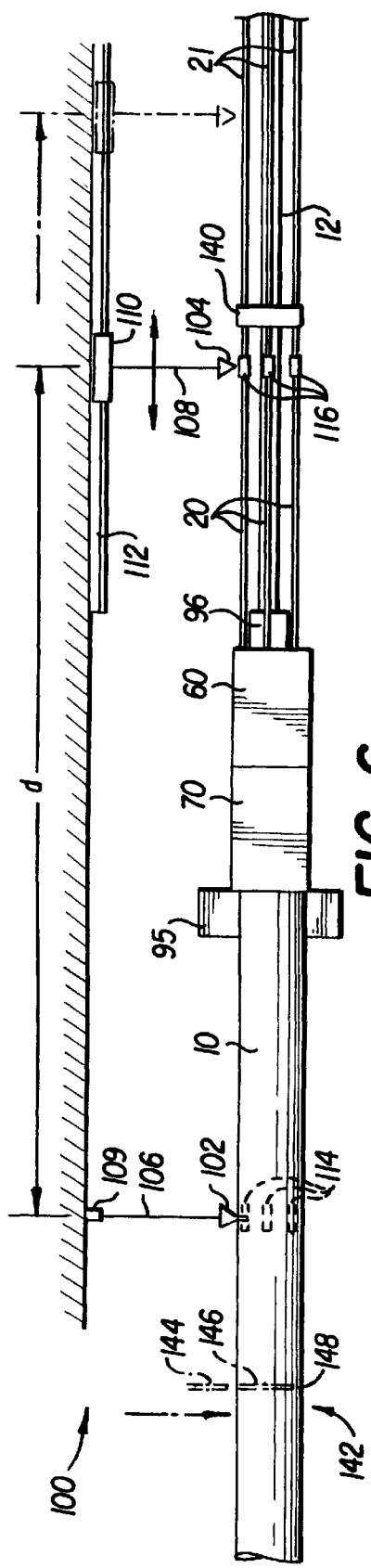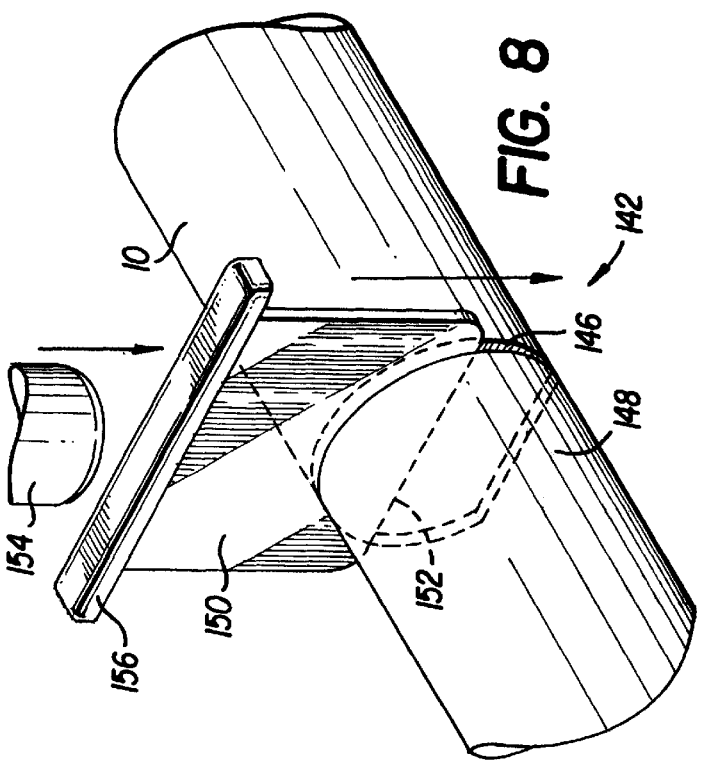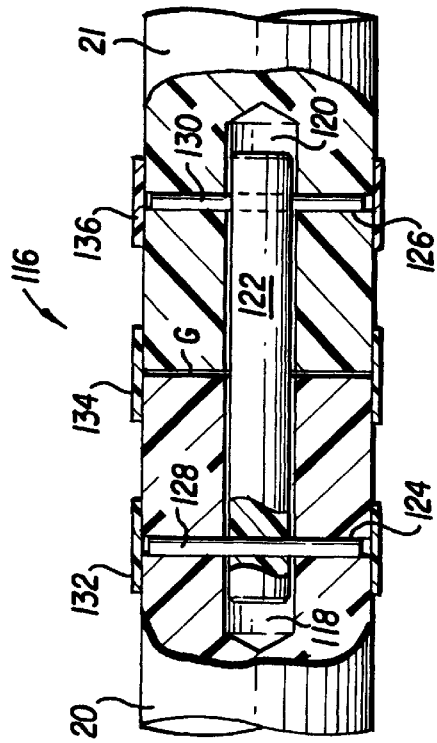

METHOD OF MAKING EXTRUDED PLASTIC MEMBERS

FIELD OF THE INVENTION

The present invention generally relates to elongated plastic members formed by extrusion, especially reinforced plastic marine pilings, telephone poles and the like, and more particularly to improvements in the methods of and apparatus for extruding such members.

BACKGROUND OF THE INVENTION

Traditional marine pilings are made of steel, concrete, or wood. Steel and concrete are very heavy and expensive and do not have desired resiliency for fendering applications. Steel is especially subject to rapid corrosion in a marine environment. Wood suffers from rapid erosion and is subject to attack by marine animals which deplete its effectiveness. In order to prolong its useful life, wood used, e.g., for marine pilings, telephone poles, and railroad ties, is typically treated with a preservative, such as creosote. However, creosote and other preservatives are detrimental to the environment. Furthermore, given the recent efforts for preservation of forests, the use of wood pilings, poles and ties is not desirable.

Marine pilings made of plastic have been proposed. For example, U.S. Pat. No. 5,051,285 discloses a structural plastic member suitable for use as a plastic piling. A steel pipe is positioned in a mold and coated with thermoplastic resins, fillers, and additives. The plastic is cooled and the resultant plastic member is then removed from the mold.

This approach suffers many disadvantages. Marine pilings typically vary in length from ten to eighty feet and have a diameter as small as three inches depending on a specific application. As a piling manufacturer must either construct molds of varying sizes, which is very expensive, or use a single mold to produce pilings of a certain length and diameter and join multiple pilings longitudinally to achieve the desired length.

The use of a mold also limits the length of a piling which can be produced. The plastic in the mold must be in a flowable state throughout the entire process of filling the mold. The flowable state becomes difficult to maintain as the length and size of the structure is increased. Additionally, the adhesion of the plastic to the pipe is difficult to control in such an operation where the plastic melt is introduced at one end of an elongated mold and required to stick to the metal core pipe at the opposite end, which is typically at least ten feet away. It is believed that such a formed structure would contain hollows or at least weak areas formed by interfaces between melt streams of different relative ages.

Because the length of the member is limited by mold size, the structure disclosed in U.S. Pat. No. 5,051,285 must be connected to other such structures to form pilings of the length required for a given application. Such joining methods and means are expensive, cumbersome and leave potential seams for water and other environmental factors to attack the metal pipe core. Regardless of the production method, plastic pilings must be properly cooled so that the plastic maintains its appropriate shape. Such a cooling process may be lengthy, particularly since pilings typically exceed 10 inches in diameter and 30 feet in length. If cooling time is sacrificed, the piling may bend or sag from its desired shape.

The foregoing problems with respect to marine pilings have been solved to a great extent by the methods and apparatus disclosed in related U.S. Pat. Nos. 5,650,224 and 5,658,519, both of which are assigned to the assignee of the present invention and the subject matter of which is incorporated herein by reference. In the methods disclosed in the aforesaid applications, the continuously extruded members are reinforced by a plurality of substantially rigid rods or rebar that are fed to the extrusion die continuously or in discrete lengths.

The use of steel or glass fiber reinforcing rods such as steel rebar or pultruded glass fiber rebar of given lengths in a continuous extrusion process requires that the individual rods or rebar be connected together end to end. Because of the high tensile forces acting on the reinforcing rods during the extrusion process, the joint or splice between the reinforcing rods, particularly the glass fiber rebar, must be extremely reliable. Failure of such a splice can result in scrapping of an entire extruded piling of thirty to one hundred feet in length having a diameter of eight to sixteen inches or more.

It has been found that all the joints between the reinforcing rods must be located at the free ends of the extruded member rather than intermediate the length of the member. Otherwise, the strength of the piling will be adversely affected. One difficulty in forming continuously extruded reinforced plastic members of such large diameter as marine pilings, telephone poles and the like, is that when the member is cut, the possibility exists that the plastic has not completely solidified across the entire cross-section thereof. This occurs even when a central plastic core is used as a heat sink to enhance cooling and solidification of the molten plastic. Accordingly, it is possible during the cutting of the extruded member at the reinforcing rod joints that molten plastic will leak from the cut end of the member resulting in internal voids in the extruded member.

Therefore, there is also a need for a reliable joint connection, especially between the ends of pultruded glass fiber rebar, as well as a method for determining the location of the reinforcing rod joints in the extruded member so that the member can be cut precisely at the joints thereby providing an extruded member with joint-free reinforcing rods. Furthermore, there is a need for a way to prevent leakage of molten plastic from the extruded member when it is cut at the reinforcing rod joints.

SUMMARY OF THE INVENTION

Accordingly, the present invention is directed to improvements in elongated extruded plastic members and improved methods of making such members that solves the above-described limitations of the prior methods and extruded members. Additional features and advantages of the invention are set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To achieve these and other advantages and in accordance with the purpose of the invention, as embodied and broadly described, the extruded member to which the invention is applicable includes a plastic core having a central longitudinal axis, a peripheral surface and a plastic shell surrounding the plastic core and bonded to the peripheral surface of the plastic core. A plurality of rigid reinforcing bars are embedded in the plastic shell in positions substantially parallel to the central longitudinal axis of the plastic core.

The elongated member is made by continuously extruding a molten plastic into a die and feeding a substantially solid plastic core into the die, the core having a lower temperature than the molten plastic. A plurality of reinforcing bars are also fed into the die so that the reinforcing bars are substantially parallel to a longitudinal axis of the die and are positioned around a peripheral surface of the core. The molten plastic entering the die surrounds and bonds to the plurality of reinforcing bars and the peripheral surface of plastic core. The molten plastic is then cooled so that the molten plastic, the plastic core, and the plurality of reinforcing bars are formed into an elongated member having a predetermined cross-section, with the plastic core acting as a heat sink to facilitate cooling of the molten plastic. The above-described elongated, continuously extruded member is described in the aforesaid applications assigned to the assignee of this invention.

According to the present invention, the reinforcing bars have lengths corresponding to the desired lengths of the elongated members to be extruded. For example, if it is desired to extrude a marine piling having an eighty foot length, the reinforcing bars are cut to an eighty foot length and are individually joined to the reinforcing bars of the preceding extruded member. When the reinforcing bars are glass fiber rebar, they are joined with a specially designed joint connection or splice according to the present invention.

Determination of the locations of the splices or joint connections of the reinforcing bars in the extruded member is difficult when the plastic is pigmented with color, or is black as is preferred. Since the ends of the extruded member must coincide with the splices between adjacent reinforcing bars, it is necessary to cut the extruded member precisely at the splices. In order to precisely locate the point along the extruded member when the cut should be made, a pair of spaced plumb bobs or similar marker devices are suspended from a wire or rod located above and in a plane passing through the extrusion axis of the extruded member. A first one of the plumb bobs is movable along the wire or rod and is located upstream of the extruder but downstream of the point where the reinforcing bar splices are made. The second plumb bob is located just downstream of the cooling jacket of the extruder. When an extruded member of a particular length, e.g., eighty feet, is to be extruded, eighty foot length reinforcing bars are joined to the preceding bars with the aforesaid special splice or joint connection. The first or movable plumb bob is then positioned exactly eighty feet upstream of the second plumb bob.

After the reinforcing bar splices have been made, the joint moves toward the extruder at the extrusion rate of the extruder. When the joint passes directly beneath the first plumb bob, a mark is made on the extruded member directly beneath the second plumb bob. That mark precisely locates the downstream reinforcing bar splices and the transverse plane at which the extrusion should be cut.

If the next member to be extruded is also eighty feet in length, the first plumb bob need not be moved and the cut mark for that member is made in the same way as described above.

If the next member to be extruded is a different length, the first plumb bob is moved a distance from the second plumb bob corresponding to that different length and the above marking process is repeated.

It is to be understood that both the foregoing general description and the following detailed description of the invention are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, explain the principles of the invention.

BRIEF DESCRIPTION OF THE DRAWINGS

FIG. 6 is a side elevation schematic view of the extrusion apparatus showing a device according to the invention for determining the location of the reinforcing rod splices in the extruded member;

FIG. 7 is a fragmentary detail view, partly in cross-section, of the structure of a splice between two reinforcing rods; and FIG. 8 is a perspective view showing the use of a cold plate in a saw cut to prevent leakage of molten plastic and to accelerate cooling of the cut ends of adjacent elongated members.

DETAILED DESCRIPTION OF THE INVENTION

Reference will now be made in detail to the present preferred embodiments of the invention, examples of which are illustrated in the accompanying drawings. FIGS. 1–5 illustrate two embodiments of elongated extruded members and an extrusion apparatus for making the members according to the aforementioned U.S. Pat. Nos. 5,650,224 and 5,658,519. The improvements according to the present invention are illustrated in FIGS. 6–8, and are intended for use with the extruded members and apparatus of FIGS. 1–5, although the improvements could be applied to other extruded members and apparatus.

Figure 1:
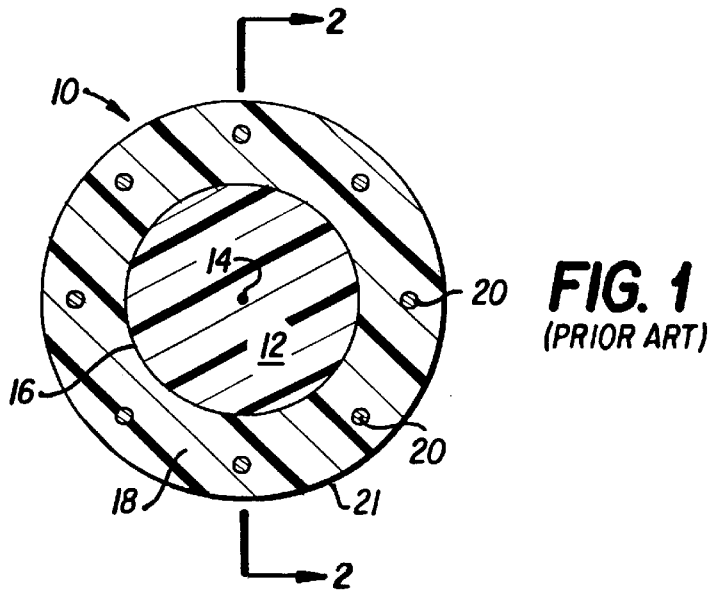
FIG. 1 is a cross-sectional view of an embodiment of an elongated member made according to the present invention.
Figure 2:
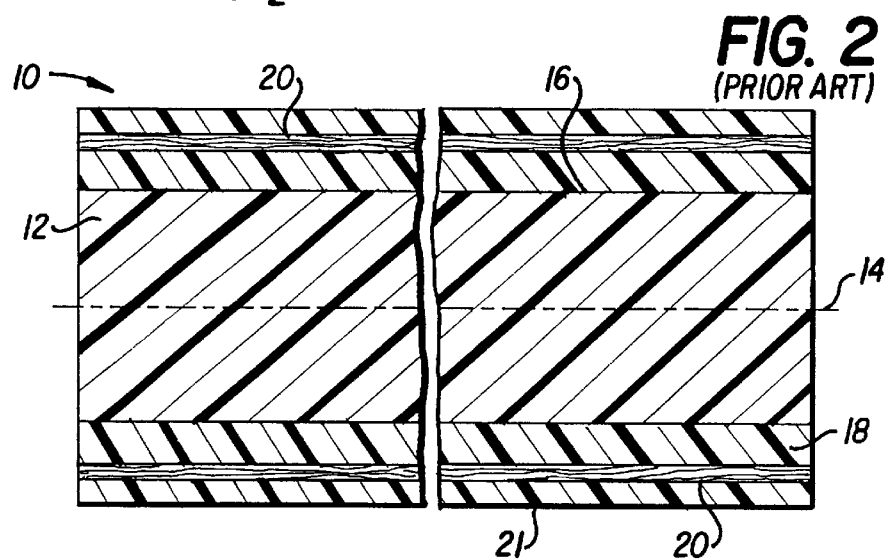
FIG. 2 is a longitudinal sectional view of the elongated member shown in FIG. 1 taken along the line 2—2 of FIG. 1.

An exemplary embodiment of the elongated member to which the present invention is applicable is shown in FIGS. 1 and 2 and is designated generally by reference numeral 10. Elongated member 10 includes a plastic core 12 having a central longitudinal axis 14 and a peripheral surface 16. A plastic shell 18 is bonded to the peripheral surface 16 of the core 12 and includes a peripheral surface 21. Rigid reinforcing bars 20 are embedded within the plastic shell 18 to stiffen the composite structure. Preferably, the bars 20 are individual bars which extend without joints from end to end of the elongated member.

The plastic core 12 and plastic shell 18 are plastic matrices composed of suitable thermoplastic resins, such as high density polyethylene (HDPE), low density polyethylene (LDPE), linear low density polyethylene (LLDPE), polypropylene (PP), thermoplastic polyester (PET), or combinations thereof. A composition of 100% HDPE is one example of a plastic matrix that may used.

Virgin and recycled thermoplastic resins may be used. Recycled thermoplastic resins are preferred because of their availability, low cost, and performance. Such recycled thermoplastic resins are available from both post-consumer and post-industrial sources. The plastic core may be composed of lower quality plastic materials than that of the plastic shell, thereby reducing production costs, because its strength is not as important as the strength of the plastic shell.

Various additives can be mixed with the plastic materials to enhance the performance of the structural member. These additives, which are primarily added to the plastic matrix for the plastic shell 18, include materials, such as antioxidants, colorants, UV protectors, fungicides and compatibilizers.

Fillers may be added to the plastic matrices to reduce the amount of plastic needed, provide stiffness, and, in some cases, enhance performance. Fillers include mineral products such as calcium carbonate, talc, chopped glass fiber, and silica, as well as waste products such as wood chips, sawdust, ground foam, scraps, and ground paper.

The plastic matrices may also be foamed to reduce the density thereof by up to about 50 to 70%. Foaming can be effected by including one or more chemical blowing agents in the plastic mixtures. A chemical blowing agent reacts with heat in an extruder to liberate gases, such as water vapor, carbon dioxide, and nitrogen. Typical chemical blowing agents are well known in the art and include, for example, azodicarbonamide and mixtures of citric acid and sodium bicarbonate. Physical blowing agents such as nitrogen gas, carbon dioxide, alkanes, and halogenated hydrocarbons can also be used.

As shown FIGS. 1 and 2, a plurality of reinforcing bars 20 are disposed within the plastic shell 18 and are substantially parallel to the central longitudinal axis 14 of the structural member. At least four reinforcing bars are preferably used. The diameter and composition of the reinforcing bars are chosen to give the desired strength and corrosion properties.

The reinforcing bars may be steel or glass fiber rods. The reinforcing bars preferably have an exterior profile, such as transverse ribs, or helical grooves to increase bonding between the reinforcing bars and the plastic shell, and thereby deter slippage between the bars and the plastic shell during cooling. Rebar such as those used for concrete reinforcement has such a profile (i.e., transverse ribs) and may be used. Steel rebar is also relatively inexpensive. For increased corrosion resistance, the steel rebar can be coated with any well-known protective coatings, such as polyester (e.g., Scotch Kote™ from 3M).

For optimum corrosion resistance and metal-free (e.g., non-magnetic) construction, pultruded glass fiber rods or rebar are preferably used. Glass fibers are pultrusion cast continuously in a matrix of a thermoset resin such as polyester or vinyl ester. For example, individual fibers are fed into a resin bath and are then fed into a curing and shaping die that heats and shapes the glass fibers (preferably two or more fibers for each rod) soaked with the thermoset resin to form pultrusion cast glass fiber rods, as is known in the art. The cured or partially cured rods may also be wrapped with a fabric material, such as polyester, and then helically wrapped with glass fibers to form a profile.

The reinforcing bars 20 are placed in the plastic shell at locations where they will contribute the most to the strength and stability of the structural member without being exposed to the environment through scraping, cutting, or bending of the structural member. The reinforcing bars are preferably placed no closer than 0.25 inches from the outer surface of the structure to be reasonably safe from potential exposure to environmental elements, and are preferably placed between zero and 0.5 inches from the peripheral surface of the plastic core. The reinforcing bars are also preferably arranged concentrically around the central longitudinal axis 14 of the elongated member, as shown in FIG. 1.

Figure 3:
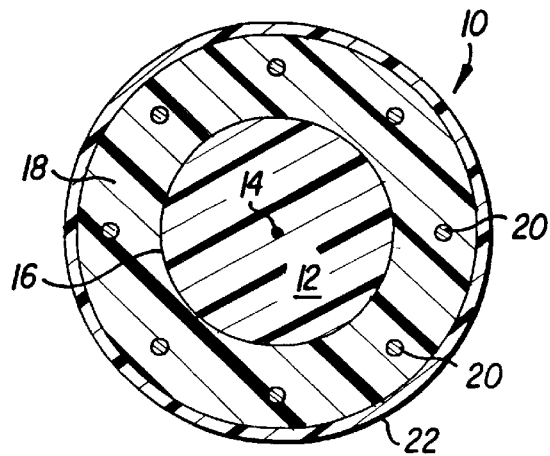
FIG. 3 is a cross-sectional view of another embodiment of the elongated structural member according to the present invention.

As shown in FIG. 3, the elongated member 10 may include a skin layer 22 formed on the peripheral surface 21 of the plastic shell 18. The skin layer may be composed of an unfoamed plastic matrix that provides a structural, protective skin and allows the plastic shell to be foamed to lower densities than if the complete structure was foamed. The matrix of the skin layer also preferably includes additives such as UV protectors, antioxidants, fungicides, making it unnecessary to include them in the matrix of the plastic shell.

Figure 4:
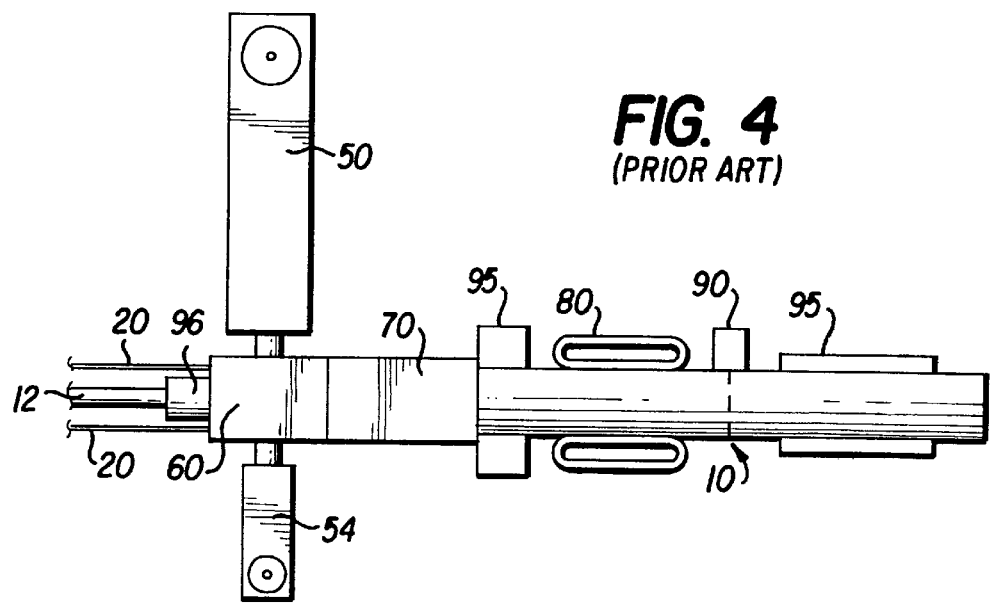
FIG. 4 is a diagram of a system for making an elongated member of the present invention.
Figure 5:
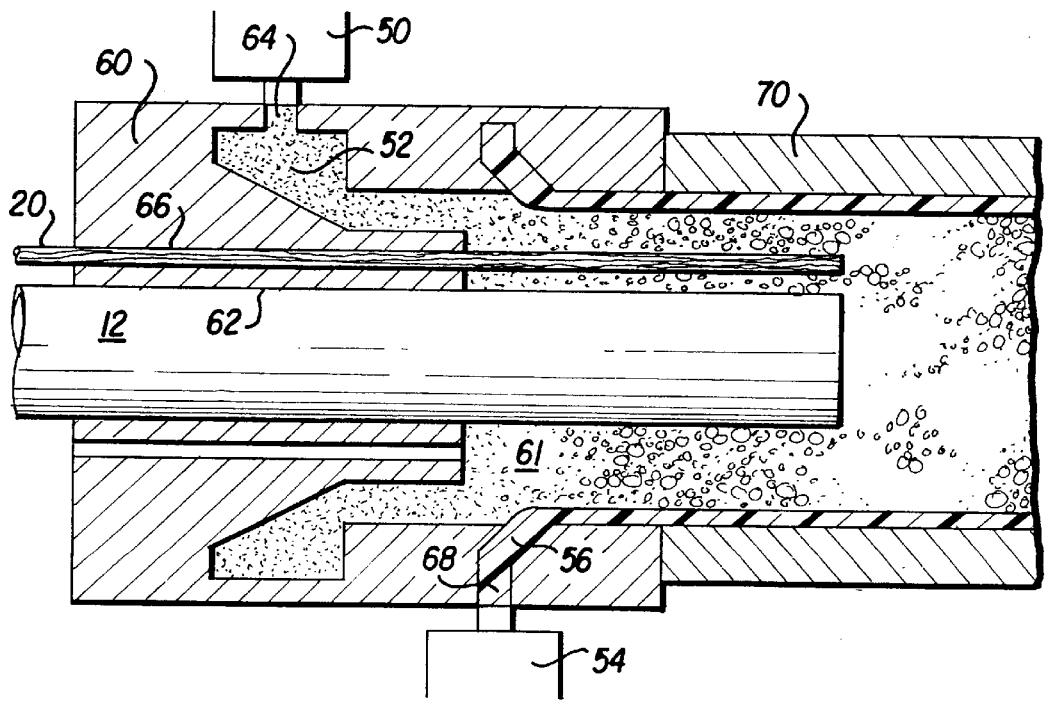
FIG. 5 is a partial longitudinal sectional view of a die used for making an elongated member of the present invention.

An apparatus for making the elongated member of the present invention is illustrated in FIGS. 4 and 5 and includes an extruder 50, die 60, shaping and cooling station 70, puller 80, and cutter 90. Additional cooling stations 95 may be included either before and/or after the puller to further cool the plastic member.

The plastic shell 18 is formed by feeding a desired mixture of plastic resins, fillers, additives, and blowing agent to the extruder 50. The extruder melts and mixes the components to form a melt 52, which is fed to the die 60.

The melt 52 is subsequently shaped and cooled to form the product, such as a marine piling. Since a marine piling is typically at least 10 inches in diameter, the plastic melt must be rapidly cooled or otherwise supported so that the product does not bend or sag when exiting the die and shaping and cooling station 70. To facilitate cooling and prevent bending, the plastic core 12 is preformed before entering the die and acts not only as a support for the plastic melt forming the plastic shell, but also as a heat sink to more rapidly cool the melt, thereby increasing production line speed. Although not critical, the cross-sectional area of the core should preferably be about half of the total cross-sectional area of the elongated member.

FIG. 5 is a cross-sectional view of die 60, which is illustrated as a crosshead die having an interior portion 61 for receiving the molten plastic, the plastic core, and the reinforcing bars, a central opening 62 through which the plastic core passes as it is fed into the interior portion, a lateral opening 64 coupled to the extruder 50, and a plurality of ports 66 parallel to the central opening 62 for receiving and supporting the reinforcing bars as they are fed into the interior portion 61 of the die 60 by a feeding apparatus (not shown). If an outer skin layer is to be formed on the plastic shell, a second extruder 54 is coupled to a second lateral opening 68 of the die.

The plastic core 12 is in a substantially solid or solid state as it enters the die. The core may be formed in sections by molding or as a continuous piece by extruding processes. Although not required, the core may include reinforcing elements or fibers to increase its stiffness. Since the core acts as a heat sink for removing thermal energy from the molten plastic during the cooling and shaping process, it must have a lower temperature than the molten plastic when entering the die. Room temperature is sufficient and provides for ease in handling the core. Optionally, the core may be chilled. A pusher (not shown) may be provided to push the core and/or reinforcing bars into the die. In addition, means for joining core sections may be included upstream of the die to ensure a continuous process.

To increase bonding between the core and the molten plastic forming the plastic shell, the peripheral surface of the core may be heated to its melting point to partially melt the surface of the core. Since only the surface is melted, the bulk of the core remains at a lower temperature than the molten plastic comprising the shell and still acts as a heat sink. Preheating of the core surface may be accomplished by a preheater 96 upstream of the die (see FIG. 4) or incorporated in the die upstream of the interior portion 61. Such a preheater may utilize electric heat, flame, hot oil, or other well known heat transfer methods.

Optionally, the core may be made with an outer layer that has a lower melting point than the rest of the core, and which could enhanced bonding with the plastic shell and preclude the need for preheating the core since the molten plastic would melt the outer layer. Such materials may include lower melting thermoplastics and adhesives.

When the molten plastic first enters the die, a stopper (not shown) may be used to seal the interior portion 61 of the die to accumulate the molten plastic so that it fills the die and is pre-shaped prior to entering the cooling and shaping station 70. The stopper is moved at a constant rate through the cooling and shaping station until an initial portion of the structural member is cooled and hardened.

The melt 52 entering the die surrounds the reinforcing bars and foams from the outside in, giving a denser foam towards the skin layer 22. The density of the foam is preferably lower towards the center of the structure and higher near the outside surface to provide optimum support for the reinforcing bars, thus contributing to the overall strength of the structure. The foam density is substantially uniform, however, along the longitudinal axis of the structure.

The elongated member is cooled and shaped by the cooling and shaping station 70, which may utilize a vacuum to maintain the shape. This station may be a tube and shell heat exchanger which contains an opening of a predetermined cross-section which forms the elongated member into a desired cross-sectional shape (e.g., circular for marine pilings, rectangular for railroad ties). The cooling portion may also include several jets for impinging cooling water or other fluid against the peripheral surface of the elongated member. The dissipation of heat via the cooling station and the plastic core allows the molten plastic to solidify into the desired shape.

The elongated member is pulled away from the die and cooling and shaping station at a controlled rate by a puller, such as a caterpillar type puller. The rate of the puller is controlled to allow sufficient foaming of the plastic mixture and to prevent deformation of the elongated member due to excessive back pressure produced in the die.

A cutter 90 is used to cut the elongated member at the desired length when it is sufficiently cooled. It has been found that when the reinforcing rods are made of glass fiber rebar, a conventional chain saw may advantageously be used to cut the elongated member at the appropriate point which is determined according to the invention as described hereinafter.

If pultruded glass fiber rods or rebar are used as reinforcing bars 20, it is preferable that the rods are formed, cured into substantially rigid glass fiber rods or rebars and cut to appropriate lengths, e.g., thirty feet, sixty feet, eighty feet, etc., corresponding to the desired length of the elongated member to be extruded. In such case, the desired number of glass fiber rebars of a given length must be supplied to the extrusion apparatus and are preferably tightly secured to the core 12, e.g., by strapping, in a concentric arrangement about the core at one or more locations upstream of the extruder.

In accordance with the present invention, the desired length of the elongated member must be predetermined so that reinforcing rods of that length may be selected and supplied to the extrusion apparatus along with the plastic core member 12. The ends of the reinforcing rods coincide with the ends of the elongated member so that the cuts made by the cutter 90 must be aligned with the ends of the reinforcing rods. In addition, since the reinforcing rods must be fixedly positioned with respect to the ends of the core member and to each other, they are preferably "pulled" through the extruder by the reinforcing rods of the previously extruded elongated member. For this purpose, the leading ends of each the reinforcing glass fiber rods of an elongated member to be extruded are fixed or spliced to the respective trailing ends of the immediately downstream elongated member. The reinforcing rods may also be strapped to the core member adjacent the location of the splices. These steps insure that the reinforcing rods move into the extrusion die at the same rate relative to one another and to the core member and that the splices between reinforcing rods remain transversely aligned.

Referring now to FIG. 6, there is shown in a schematic side elevation view an apparatus 100 that is used to precisely locate the reinforcing rod splices in the opaque extruded member so that a cut may be made at the splices. The extrusion apparatus of FIGS. 4 and 5, including the extrusion die 60, cooling stations 70, 95 and preheater 96 are used to form elongated member 10 with a core member 12 as described above. The apparatus 100 comprises a pair of plumb bobs 102, 104 or similar devices suspended by flexible wires or cords 106, 108 directly above the longitudinal axis (extrusion axis) of the elongated member 10. Plumb bob 102 is suspended in a fixed location downstream of the cooling stations 70, 95 and plumb bob 104 is suspended from a slider 110 which is movable along a rod or wire 112 so as to adjust the longitudinal distance d between the plumb bobs to any desired dimension corresponding to the range of lengths of the elongated members to be extruded.

For an elongated member 10 of a length of, e.g., sixty feet, a plurality of glass fiber reinforcing rods 20 having a length of sixty feet are selected from stock or cut to that length. Slider 110 is moved along wire or rod 112 until the distance d between the plumb bobs 102, 104 is sixty feet. At any location upstream of the extrusion apparatus, the leading ends of the sixty foot long reinforcing rods 20 are spliced to the trailing ends of the previous or downstream reinforcing rods (not shown) at splices 114 shown in dashed lines in FIG. 6. Assume the next elongated member to be extruded is to be eighty feet in length. Reinforcing rods 21 having a length of eighty feet are selected and spliced to the trailing ends of the reinforcing rods 20 at splices 116. As extrusion of elongated member 10 progresses, the splices 116 will eventually be aligned with the plumb bob 104 as shown in FIG. 6. When that alignment occurs, an operator gives a "mark" with an audible signal and another operator places a visible marking on the elongated member 10 at the location of the plumb bob 102. That marking precisely coincides with the splices 114 and provides the marking for making the cut in the elongated member 10 which is done downstream of the plumb bob 102 as described hereafter.

Since the next member to be extruded is to be eighty feet in length, the slider 110 and plumb bob 104 are moved to a new location along rod 112 as shown in phantom lines in FIG. 6 twenty feet upstream of their previous location. Thus, when the trailing end splices (not shown) of the eighty foot long reinforcing rods 21 pass beneath the plumb bob 104, the leading end splices 116 will be aligned with the plumb bob 102. In this way, the saw cut will always be made precisely at the location of the reinforcing rod splices.

FIG. 7 illustrates a particularly preferred form of a splice 116 between glass fiber reinforcing rods or rebars 20 and 21. A number of different types of splices were tested, but suffered from a number of deficiencies and limitations, primarily because of the inability to withstand the large forces applied to the reinforcing rods during extrusion of the plastic around the rods. The splice 116 is constructed by drilling blind holes 118, 120 in a respective end of the rods 20, 21. A glass fiber pin 122 having a diameter slightly less than the diameter of the blind holes 118, 120 is inserted into the holes. Holes 124, 126 are diametrically drilled through the ends of reinforcing rods 20, 21 and pin 122. Dowels or pins 128, 130, preferably glass fiber dowels, are inserted into the holes 124, 126 to secure or splice the ends together. Thereafter, tape strips 132, 134, 136, which are preferably glass fiber tape, are wrapped about the locations of the holes 124, 126 and the space or gap G between the ends of the reinforcing rods 20, 21. While the tape is shown in FIG. 7 as three discrete strips, it could be in the form of a single strip of tape or a wrapping of tape extending between the holes 124, 126. The tape strips 132, 134, 136 effectively prevent the high pressure molten plastic from seeping into the spaces in the joint and creating large forces that could cause the splice to fail. It has also been found that it is preferred that there be a relatively loose fit, i.e., not an interference fit, between the pin 122 and the holes 118, 120.

It is desirable that the reinforcing rods 20, 21 be secured to the core member 12 upstream of the extruder so that the core and reinforcing rods are fed to the extrusion apparatus as a substantially monolithic member with no relative movement between them. For this purpose, one or more straps 140 (FIG. 6) may be used to secure the reinforcing rods to the core member 12 and to keep them in an equiangular relationship to one another. As the strap 140 approaches the preheater 96 and die 60, it may be released, removed from the rods and core and reused at an upstream location.

Another aspect of the present invention involves the cutting off of the elongated member 10 at the location of the joints or splices 114 where it has been marked for cutting using the apparatus 100 as described above. Using a conventional chain saw, an operator makes a transverse cut at the mark from the top of the elongated member 10 downwardly as shown in phantom lines generally at 142 where the chain saw is identified by reference numeral 144 and the cut by reference numeral 146. It should be understood that the cut 146 will actually be made at the splices 114 when the splices have moved to the location 142 downstream of the plumb bob 102.

Referring now to FIG. 8, which shows the location 142 in more detail, the chain saw 144 (FIG. 6) has been used to cut substantially through the extruded member 10 at cut 146 leaving an uncut portion 148 at the bottom of the member 10. The chain saw is then removed from the cut 146 and a chilled flat metal plate 150, made of aluminum for example, is driven into the cut 146 using a mallet 154 until the bottom edge 152 of plate 150 is proximate the uncut portion 148. A crossbar 156 is secured to the upper edge of the plate 150 to provide a broader surface for driving the plate with the mallet.

Preferably, the plate 150 has a thickness substantially the same as the width of cut 146 so as to bear tightly against the opposing faces of the cut 146. To the extent there may still be molten or semi-molten plastic in the extruded member at the downstream point where the cut 146 is made, the chilled plate 150 functions to rapidly cool and solidify the confronting surfaces of the cut so that no plastic leaks or flows from the ends of either the upstream or downstream elongated member. The plate 150 may be chilled to a temperature of from about 32° F. to about 45° F. While it is not essential that the plate be chilled, such chilling accelerates solidification of the cut ends of the elongated members.

After the confronting ends of the members have solidified, the operator cuts the uncut portion 148 with the chain saw from bottom to top. The plate 150 may be removed before or after the cut is completed, but is preferably removed before the final cut is made.

The elongated members made with the above-described apparatus are suitable for many uses, such as marine pilings, telephone poles, railroad ties, etc. For use as a piling, the elongated member will typically be between about ten to sixteen inches in diameter and between about thirty to eighty feet in length of continuous structure. Additionally, the diameter or cross-sectional shape of the piling can be altered by changing the die (or portions thereof) and cooling and shaping station.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A method of producing an elongated, substantially rigid structural member suitable for use as a marine piling or structural element comprising the steps of:

providing a solid, substantially rigid plastic core element having a longitudinal axis and an outer periphery;

providing a plurality of discrete, substantially rigid reinforcing bars of a given length, each bar having a longitudinal axis and leading and trailing ends;

providing an extrusion die having a longitudinal extrusion axis and a predetermined cross-sectional shape and area;

feeding the core element into the extrusion die with the longitudinal axis thereof arranged substantially coincident with the longitudinal extrusion axis of the die;

feeding a first group of the discrete reinforcing bars into the die with the longitudinal axes thereof arranged substantially parallel to the longitudinal axis of the core element;

continuously feeding a molten plastic into the die;

flowing the molten plastic around and in contact with the outer periphery of the core element and the reinforcing bars;

continuously extruding the molten plastic through the die together with the core element and reinforcing bars to form the molten plastic into a continuously extruded member with an outer surface;

splicing the leading ends of a second group of the discrete reinforcing bars to the trailing ends of the first group of the discrete reinforcing bars to form a group of splices;

positioning a first marking means at a fixed location downstream of the extrusion die;

positioning a second marking means upstream of the extrusion die at a distance from the first marking means equal to the given length of the reinforcing bars;

marking the extruded member at the first marking means when the group of splices is aligned with the second marking means;

cutting the extruded member at the marking on the extruded member to form a transverse cut with confronting end surfaces in the extruded member; and inserting a metal plate in the transverse cut in the extruded member to solidify any molten plastic at the confronting end surfaces of the extruded member.

2. The method of claim 1, including the step of suspending the first and second marking means in a vertical plane above the longitudinal extrusion axis of the extrusion die.

3. The method of claim 1, including the step of chilling the metal plate prior to inserting it into the transverse cut.

4. The method of claim 1, including the step of chilling the metal plate to a temperature of between about 32° F. to about 45° F. prior to inserting it into the transverse cut.

5. The method of claim 1, wherein the step of cutting is made partially through the extruded member at a marking on the outer surface of the extruded member to form a transverse cut with confronting end surfaces in the extruded member; including chilling the metal plate to a temperature of between about 32° F. to about 45° F. prior to inserting it into the transverse cut; and cutting fully through the extruded member.

6. The method of claim 1, wherein the marking step includes a step of marking the outer surface of the extruded member with a visible mark and cutting the extruded member at the visible mark on the outer surface of the extruded member to form said transverse cut.

7. The method of claim 1, wherein said first and second marking means comprise plumb bobs.

8. The method of claim 1, including a step of moving the second marking means along an axis parallel to the extrusion axis in an upstream or downstream direction to position the second marking means a distance from the first marking means equal to the given length of the reinforcing bars.

9. A method of producing an elongated extruded member comprising the steps of:

providing a plurality of discrete, substantially rigid glass fiber reinforcing bars of a given length, each bar having a longitudinal axis and leading and trailing ends;

providing an extrusion die having a longitudinal extrusion axis and a predetermined cross-sectional shape and area;

feeding a first group of the discrete glass fiber reinforcing bars into the die with the longitudinal axes thereof arranged substantially parallel to the longitudinal axis of the extrusion die;

continuously feeding a molten plastic into the die;

flowing the molten plastic around and in contact with the outer peripheries of the reinforcing bars;

continuously extruding the molten plastic through the die together with the glass fiber reinforcing bars to form the molten plastic into a continuously extruded member with an outer surface;

splicing the leading ends of a second group of the discrete reinforcing bars to the trailing ends of the first group of the discrete glass fiber reinforcing bars to form a group of splices;

positioning a first marking means at a fixed location downstream of the extrusion die;

positioning a second marking means upstream of the extrusion die at a distance from the first marking means equal to the given length of the glass fiber reinforcing bars; and marking the extruded member at the first marking means when the group of splices is aligned with the second marking mean;

cutting the extruded member at the marking on the extruded member to form a transverse cut with confronting end surfaces in the extruded member; and inserting a plate in the transverse cut in the extruded member to solidify any molten plastic at the confronting end surfaces of the extruded member.

10. The method of claim 9, including the step of suspending the first and second marking means in a vertical plane above the longitudinal extrusion axis of the extrusion die.

11. The method of claim 9, including the step of chilling the plate prior to inserting it into the transverse cut.

12. The method of claim 9, including the step of chilling the plate to a temperature of between about 32° F. to about 45° F. prior to inserting it into the transverse cut.

13. The method of claim 9, wherein the step of cutting is made partially through the extruded member at a marking on the outer surface of the extruded member to form a transverse cut with confronting end surfaces in the extruded member; including chilling the metal plate to a temperature of between about 32° F. to about 45° F. prior to inserting it into the transverse cut; and cutting fully through the extruded member.

14. The method of claim 9, wherein the marking step includes a step of marking the outer surface of the extruded member with a visible mark and cutting the extruded member at the visible mark on the outer surface of the extruded member to form said transverse cut.

15. The method of claim 9, wherein said first and second marking means comprise plumb bobs.

16. The method of claim 9, including a step of moving the second marking means along an axis parallel to the extrusion axis in an upstream or downstream direction to position the second marking means a distance from the first marking means equal to the given length of the glass fiber reinforcing bars.

17. The method of claim 9, wherein the plate is an aluminum metal plate.

* * * * *